US010142530B2

(12) United States Patent
Smith et al.

(10) Patent No.: US 10,142,530 B2
(45) Date of Patent: Nov. 27, 2018

(54) SYSTEM AND METHOD FOR TAKING HIGH RESOLUTION PHOTOGRAPHS AND VIDEOS USING A MOBILE DEVICE MOUNT WITH ILLUMINATION

(71) Applicant: Jigsaw Informatics, Inc., Palo Alto, CA (US)

(72) Inventors: Ross Quentin Smith, Palo Alto, CA (US); Joan Lorraine Wood, San Jose, CA (US); Chris Rea, Palo Alto, CA (US); Jindrich Semenec, Fremont, CA (US); Peter Pressesky, Menlo Park, CA (US)

(73) Assignee: JIGSAW INFORMATICS, INC., Palo Alto, CA (US)

( * ) Notice: Subject to any disclaimer, the term of this patent is extended or adjusted under 35 U.S.C. 154(b) by 101 days.

(21) Appl. No.: 15/003,757

(22) Filed: Jan. 21, 2016

(65) Prior Publication Data

US 2016/0209727 A1      Jul. 21, 2016

Related U.S. Application Data

(60) Provisional application No. 62/106,118, filed on Jan. 21, 2015.

(51) Int. Cl.
*F21V 23/04* (2006.01)
*H04N 5/225* (2006.01)
(Continued)

(52) U.S. Cl.
CPC .......... *H04N 5/2256* (2013.01); *G03B 15/05* (2013.01); *G03B 17/566* (2013.01);
(Continued)

(58) Field of Classification Search
CPC ............ H04N 5/2256; H04N 5/23241; H04N 5/23245; G03B 15/05; G03B 17/566; G03B 2215/0567
(Continued)

(56) References Cited

U.S. PATENT DOCUMENTS 6,595,422 B1 *   7/2003   Doljack .............. G06K 7/10722
                                                  235/462.42
7,448,769 B1 *  11/2008   Coushaine ............. F21L 4/005
                                                       362/200
(Continued)

*Primary Examiner* — Karl D Frech
(74) *Attorney, Agent, or Firm* — North Weber & Baugh LLP

(57) ABSTRACT

The present invention relates to taking photographs with a handheld device, and more particularly to hardware for enabling capturing, high resolution, well lighted photographs, document scans and videos, with efficient power usage, of two dimensional and three dimensional objects. The present invention relates to an ergonomic, handheld, mobile mount device with battery powered illumination to enable users to take stable, well-lit videos still photos and document scans when combined with mobile device such as a smartphone, tablet, phablet, handheld video game system, video camera, still camera, and other mobile devices. In addition, the present invention enables direct viewing using the illuminator as both a flashlight and as a magnifier, when coupled with a magnifier. In addition, the present invention enables enhanced operation of the mobile device as a scanner or fax machine when coupled with a desktop stand.

20 Claims, 26 Drawing Sheets

(51) Int. Cl.
  *H04N 5/232*   (2006.01)
  *G03B 15/05*   (2006.01)
  *G03B 17/56*   (2006.01)

(52) U.S. Cl.
  CPC ..... *H04N 5/23241* (2013.01); *H04N 5/23245* (2013.01); *G03B 2215/0567* (2013.01)

(58) Field of Classification Search
  USPC .................................. 362/16, 200; 257/100
  See application file for complete search history.

(56) References Cited

U.S. PATENT DOCUMENTS

2005/0045903 A1* 3/2005 Abe ..................... H01L 21/568
                                                                 257/100
2013/0265506 A1* 10/2013 Nishimura ........... G02B 5/0242
                                                                 349/12

\* cited by examiner

200

1600

1610  1605

SYSTEM AND METHOD FOR TAKING HIGH RESOLUTION PHOTOGRAPHS AND VIDEOS USING A MOBILE DEVICE MOUNT WITH ILLUMINATION

CROSS REFERENCE TO RELATED APPLICATION

This application claims the benefit of provisional application No. 62/106,118 filed on Jan. 21, 2015 and entitled "System and method for taking high resolution photographs and videos using a mobile device mount with illumination."

BACKGROUND

A. Technical Field

This invention relates generally to taking photographs and videos with a handheld device, and more particularly to a device to enable users to take clear, high resolution, well-lit photographs or videos and to capture document scans, in a wide range of real-world environments including environments with poor lighting, with efficient utilization of the handheld device's battery power, of two dimensional (documents) and three dimensional objects.

B. Background of the Invention

Taking clear, high resolution photographs and scans or shooting video with a handheld device such as a mobile phone, of three dimensional objects such as a piece of equipment or two dimensional items, such as a document, when located in the field or in a real-world setting as opposed to a photography studio, is difficult. There are problems holding the device steady and aiming it properly at the two or three dimensional object to be photographed or videoed, especially in real-world environments where the user's orientation may be constrained, as opposed to a photography studio. Furthermore, providing appropriate lighting for the object to be photographed or videoed is often an issue because of inadequate lighting or direct lighting which causes shadows.

Mobile devices such as smartphones are increasing in popularity as cameras since they take high resolution pictures and videos and are naturally mobile. Due to their high resolution sensors, advanced optics, ease of use, convenience and integration with communications applications including email, texting, photo and video sharing apps such as Flicker, YouTube, Shutterfly, Picasa, etc., and social media applications such as Facebook, Instagram, and Twitter, mobile devices, especially smartphones, have rapidly become the most popular cameras of all time.

Market research firm IDC reports that smartphone sales topped 1 billion units in 2013, up 38 percent year over year (see http://www.idc.comigetdoc.jsp?containerId=prUS24645514). With rapid turnover of new models within the installed base of smartphone users, plummeting prices of smartphones and rapid uptake of smartphone purchases within the developing world, sales of smartphones, each equipped with multiple megapixel cameras with advanced features and excellent connectivity, IDC predicts ongoing sales of smartphones and their associated cameras in excess of 1 billion units per year to continue for the foreseeable future. Concurrently, the CIPA (the Camera & Imaging Products Association) showed a 36 percent drop in digital camera sales over the same period: Shipments plummeted from around 98 million in 2012 to 63 million units in 2013, with the biggest losses coming among mid- and low-priced models, which, to a large degree, have been supplanted by smartphones. See http://www.cipa.jp/stats/documents/e/dw-201406_e.pdf for more information on the decline of camera sales.

Smartphones, tablets, and phablets (large smartphones with near tablet size displays), with their ability to host applications, also provide an extremely popular platform that enables service and other professionals (including realtors, contractors, property inspectors, insurance adjusters, mechanics, plumbers, estimators, service writers, field engineers, technicians, landscapers, architects, sales persons and others) to conduct their work in the field, in many cases without the encumbrance of having to use notebook computers or return to their office to file inspection reports, trouble tickets, customer support issues, insurance claims or other reports. Such professionals (and hobbyists too) now routinely use their smartphone, tablet or other mobile device to host standard or industry specific applications, which often include the ability to incorporate detailed photographs and video directly within their "app."

Smartphone or other mobile device cameras provide an ideal platform for photographing and videoing objects, events and people at close range, since they are not equipped with any (or significant) optical zoom. The single or dual Light Emitting Diode(s) (LEDs) illuminators that provide intrinsic illumination capabilities on smartphones are also designed for enhancing photography at near range.

Such intrinsic smartphone LED illuminators provide a flash for still photography and a basic continuous illumination or "flashlight" capability that also provides a "hot light" capability for videography. Because smartphones are optimized for mobility and maximum battery life, their LED illuminators have limited capabilities for both general illumination (flashlight) applications or as an aid in photography in environments with dim or poor ambient lighting. With approximately 5 to 10 lumens in flashlight or hot light mode and about 25 to 50 lumens in a single flash, these LED illuminators will drain a smartphone's battery relatively quickly. Also, because the current drain of a smartphone's LED illuminator may cause the smartphone to heat up, the smartphone's environmental sensors will automatically extinguish the LED illuminator in such circumstances. Accordingly, operation of the smartphone illumination LEDs must be limited to occasional use in field applications, since recharging the smartphone may not be convenient, and since the smartphone serves multiple purposes, including important communications and hosting professional applications. Also, many photography applications and modes within those applications preclude the use of the smartphone LED illuminator in flashlight mode. Accordingly, continuous use of smartphone illumination LED(s) for any extended period of time is not practical, either as a flashlight or as a hot light for video.

The light output of a smartphone LED illuminator, when operating in flashlight or hot light mode, is about the same as a giveaway keychain LED flashlight (5 to 10 lumens). Smartphone LED illuminator's limited output, coupled with the above mentioned battery drain issue, means using a smartphone for a flashlight in all but the most limited circumstances is not practical to any significant extent. Accordingly, professionals and consumers alike desiring to photograph objects or documents in dimly or poorly lit environments will also need a more robust (typically with 50-100 or more lumens) flashlight or headlamp for general illumination to find and/or frame their subject prior to using their smartphone to photograph the subject. Using a flashlight and a smartphone at the same time is often difficult and unwieldy, since it requires the user to both illuminate the subject with the flashlight and then use their smartphone to photograph the subject. If the user desiring to photograph or video objects or documents is in a real-world environment, such as an attic, basement, equipment room, under the hood of a car, or under a sink, using both a flashlight and a smartphone simultaneously may be very challenging and/or dangerous in some instances.

Current smartphone LED illuminators are general purpose, so their design reflects a compromise between the need for both detail and broad illumination and otherwise between utility, convenience and battery life. Smartphone LED illuminators typically have a 120 degree illumination angle, so smartphone LED illuminator light diverges very quickly, resulting in a limited range for effective illumination, for flash photography, video illumination and for use as a flashlight. However, the broad beam of the smartphone illumination LED does provide a good capability for general purpose flash photography for people, pets and similar type nearby subjects. In addition, most smartphone LED illuminators are either "on" or "off", which does not provide the lighting flexibility desired in many photography situations.

Dedicated photography lights come in different formats, including floodlights and spotlights, which is the same for many flashlights (i.e., spotlights and lanterns, and lights with adjustable beam divergence). For photography, as well as for a general illumination capability, a more focused light with a tighter illumination angle (typically 85 degrees or less) that better illuminates a target subject at desired ranges is often desired. However, current smartphone technology does not provide that selection.

FIG. 1 illustrates two LED illuminators. One LED illuminator 105 is shown with shaped illumination removed. The very wide beam angle of the LED illuminator without shaped illumination diffuses the output rapidly, which means the effective range of the illuminator is reduced. The other LED illuminator 110 is shown with shaped illumination. The light from the shaped illumination is tightly focused on the target area, which results in enhanced range and brighter illumination in the area of interest.

When photographing reflective surfaces, diffuse, polarized or indirect lighting is useful to avoid hotspots or reflections of the illuminator itself. Smartphone LED illuminators are intrinsically direct illuminators without diffusing or polarizing capabilities. So using a smartphone LED illuminator flash or hot light illumination on reflective surfaces is not practical.

FIG. 2 illustrates a direct flash photograph of a reflective surface. The flash reflects off the surface, illustrating a need for a diffused or polarized continuous or hot light or a diffused or polarized flash illuminator.

Another factor that comes into play when using a smartphone for photography or video in poor or dimly lit environments is that the smartphone's automated camera settings (shutter speed, f-stop) are directly related to the illumination "seen" by the camera sensor. In poor light, the smartphone will automatically slow the shutter and increase the f-stop or aperture in order to ensure there is enough light to capture the image. Doing so often results in grainy or blurry photos or video. When the light is adequate, smartphone sensors and camera automation do an excellent job of capturing crisp photos and videos. Because of the limited amount of light available from smartphone illumination LED(s), the smartphone's intrinsic ability to capture high quality images and videos in poor or dimly lit environments is often insufficient, as shown in FIG. 3. FIG. 3 illustrates an example of a smartphone photograph with insufficient illumination 305. FIG. 3 also illustrates an example of a smartphone photograph with sufficient illumination 310.

There is a huge difference in the quality of the photograph between image 305 and image 310. Therefore, if there were a solution to the problem of taking photos with insufficient illumination, it would dramatically increase the quality of mobile device photos and videos.

When photographing objects or documents and/or scanning documents in direct light environments, shadows from objects in the room or even the photographer or the smartphone can directly affect the viability of the captured images. FIG. 4 illustrates the shadow from the photographer and smartphone that can interfere with the captured image. Image 405 shows the image with the shadow.

Yet another factor is that many smartphones, because of limitations of their camera software, LED illuminators(s) and the desire to maximize battery life, often exclude some illumination and camera modes from simultaneous operation. In particular, most smartphone camera "apps" will not let a user use the still camera mode of the smartphone, which has exceptional resolution, and the flashlight simultaneously. Also, most smartphone camera apps also preclude a user from using the built-in flash or flashlight while operating the still camera in High Dynamic Range (HDR) mode, which uses multiple exposures to produce extremely high contrast photos. Such advanced modes require the use of good ambient light or external lighting. FIG. 5 illustrates the problem with not being able to use the illuminator with the camera in specific modes. Image 505 was taken with a smartphone set to employ HDR mode and shows the lack of illumination from the smartphone's intrinsic illuminator because its operation is excluded in HDR mode.

External lighting such as 3.5 mm audio jack attach point external illuminators, flashlights or standard photography lights can provide additional environmental lighting, but using them in an on-the-go work environment, or using such an assembly in a manner to avoid the complications of side lighting and the shadows that such lighting causes, is problematic in many service related work environments (e.g., attic, rooftop, equipment room, etc.). Having illumination that, from the smartphone sensor's perspective, is extended and not a point source, relative to the sensors and, which more uniformly illuminates the subject from the perspective of the camera is ideal.

Lastly, photography and videography, especially when conducted in poor or dimly lit environments, requires a stable platform to support the camera, because the aperture and shutter settings are optimized for light gathering, so any motion in the camera will often be translated to blurry or grainy images. In addition, because of their size and ergonomics, smartphones are often difficult to use if a user must also focus an external light on the area of interest. This issue may be exacerbated if the user is in a challenging environment, such as on his/her back or having to photograph or video something overhead.

Smartphones come in a wide range in sizes. Even within the iPhone family, the range is sizes are significant. When coupled with phone cases, the size range difference is even more pronounced. Other mobile devices with cameras, for example, tablets, phablets, mp3 players, other smartphones, video game systems, video cameras, still cameras, and other mobile devices with cameras increase the size range even more.

Also, the location of the camera on a smartphone varies from phone family to phone family. For example, on the iPhone family, the rear facing camera is on the upper left side of the phone. On many Android phones, it is in the middle and slightly lower. Again, including other mobile devices, the location of the camera varies even more.

In summary what is needed is a method and device that enables improved photographs, document scans and videos of two and three dimensional objects by providing better lighting for photography, videography, document scanning and general illumination purposes when coupled with smartphones and other mobile devices of various sizes in a wide variety of environments.

In summary, what is needed is a method and device that facilitates on-the-go mobile use by service professionals and others that can securely hold a mobile device.

In summary, what is needed is a method and device that enables improved photographs, document scans and videos of two and three dimensional objects by providing better lighting for photography, videography, document scanning and general illumination purposes that facilitates on-the-go mobile use by service professionals and others that can preserve and/or even enhance the battery life of a mobile device.

In summary what is needed is a method and device that enables improved photographs, document scans and videos of two and three dimensional objects by providing better lighting for photography, videography, document scanning and general illumination purposes, that when coupled with smartphones and other mobile devices of various sizes in a wide variety of environments, that can preserve and/or even enhance the battery life of the mobile device.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

The following description is set forth for purpose of explanation in order to provide an understanding of the invention. However, it is apparent that one skilled in the art will recognize that embodiments of the present invention, some of which are described below, may be incorporated into a number of different illuminated mounts. The embodiments of the present invention may be present in hardware, software or firmware. Structures shown below in the diagrams are illustrative of exemplary embodiments of the invention and are meant to avoid obscuring the invention. Furthermore, connections between components within the figures are not intended to be limited to direct connections. Rather, data between these components may be modified, re-formatted or otherwise changed by intermediary components.

Reference in the specification to "one embodiment", "in one embodiment" or "an embodiment" etc. means that a particular feature, structure, characteristic, or function described in connection with the embodiment is included in at least one embodiment of the invention. The appearances of the phrase "in one embodiment" in various places in the specification are not necessarily all referring to the same embodiment.

The present invention overcomes the problems of the prior art by providing a system and method of securely mounting various sized mobile devices to an illumination device that enables positioning of the mobile device to use its intrinsic camera with the illuminator irrespective of the smartphone camera's location on the smartphone body. The present invention is a handheld illuminator with a self-contained rechargeable or non-rechargeable battery that can be operated with one hand or two hands and can provide sufficient illumination to take photographs, capture document scans or shoot videos of two and three dimensional objects in no light, low light or direct light (shadow) environments. Also, the present invention provides stability for taking the photographs or videos and can also recharge the battery of the mobile device before, during or after operation. The term photography or photograph is used herein to include either or both of still photography/photograph and videography/video recording as well as document scans.

Figure 6A:
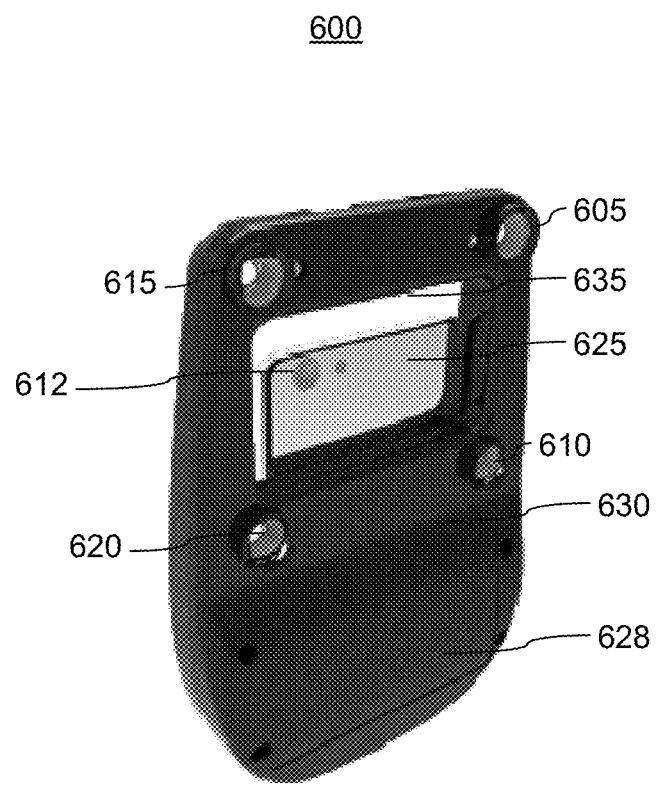
FIG. 6A illustrates an illumination device, in accordance with various aspects of the present invention.

FIG. 6A illustrates an illumination device with illumination in accordance with embodiments of the present invention. FIG. 6A shows the underside of an illumination device system 600 including illumination device 630 and mobile device 625. Illumination device 630 includes LED illuminators 605, 610, 615, and 620. FIG. 6A also shows battery compartment 628 for housing a battery or batteries that are independent from the batteries contained in the mobile device 625. In one embodiment, the battery can be a rechargeable 2600 mAH or other capacity battery. In another embodiment, the battery can be one or more standard C, D, AA, AAA or similar type non-rechargeable or rechargeable batteries of different capacities.

FIG. 6A also shows a mobile device 625, a smartphone, mounted to the device of the present invention. Mobile device 625 is not part of the present invention, but is shown in FIG. 6A to illustrate the way mobile device 625 would be used with the present invention. Mobile device 625 is aligned with viewport 635 such that mobile device 625 camera 612 can take a photo through viewport 635. While FIG. 6A shows a smartphone as the mobile device 625, any mobile device can be used, for example, the mobile device can be a smart phone, a camera, a handheld video game system, a tablet, a phablet, or any other mobile device, especially a mobile device with a camera.

In one embodiment, LED illuminators 605, 610, 615, and 620 are high brightness LEDs combined with a rechargeable 2600 mAH battery that can deliver up to 500 Lumens in continuous operation and up to 5,000 Lumens in flash mode—a factor that is approximately 100 times the illumination provided by a typical smartphone's intrinsic LED illuminator. With such a high level of illumination, coupled with its large capacity battery, the present invention can be operated in a continuous or "hot light" mode for long periods of time, thereby eliminating the need for a flash in most instances, which provides improved photographs and videos coupled with enhanced ease of use. Since the present invention has its own battery, for example a 2600 mAH battery, it does not drain the mobile device battery as the intrinsic mobile device LED illuminators do.

LED illuminators are shown. However, any illumination element can be used. For example the illumination elements can be light emitting diodes, xenon lamps, laser diodes, compact fluorescent or other lighting devices.

The LED illuminators 605, 610, 615, and 620 shown are in the same plane as the mobile device camera sensors. Since most service professionals desiring to document their work with their mobile device cameras are not professional photographers, the most user friendly way to both fully utilize a smartphone camera's smarts and simplify the user's task is to provide illumination that is similar to that provided by the smartphone intrinsically. FIG. 6A shows improved lighting because the LED illuminators 605, 610, 615, and 620 provide more illumination than is available from the smartphone's intrinsic illuminators without draining the smartphone's battery. In this embodiment, LED illuminators are in the same plane as the camera's sensors and not off-axis, which closely approximates the geometry of the smartphone's intrinsic illuminator and which will work optimally with the mobile device's camera sensors.

FIG. 6A shows one embodiment including four illuminators. However, any number of illuminators in any configuration can be used.

Figure 6B:
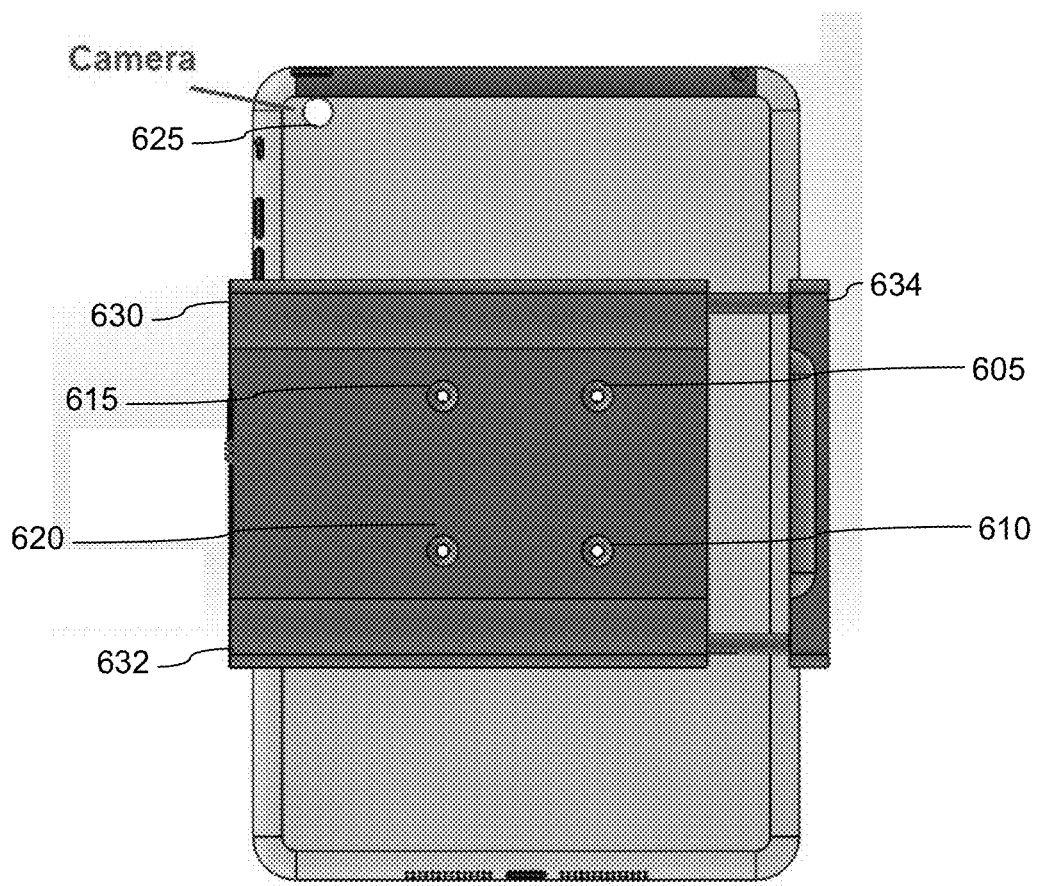
FIG. 6B illustrates an illumination device, in accordance with various aspects of the present invention.
Figure 6C:
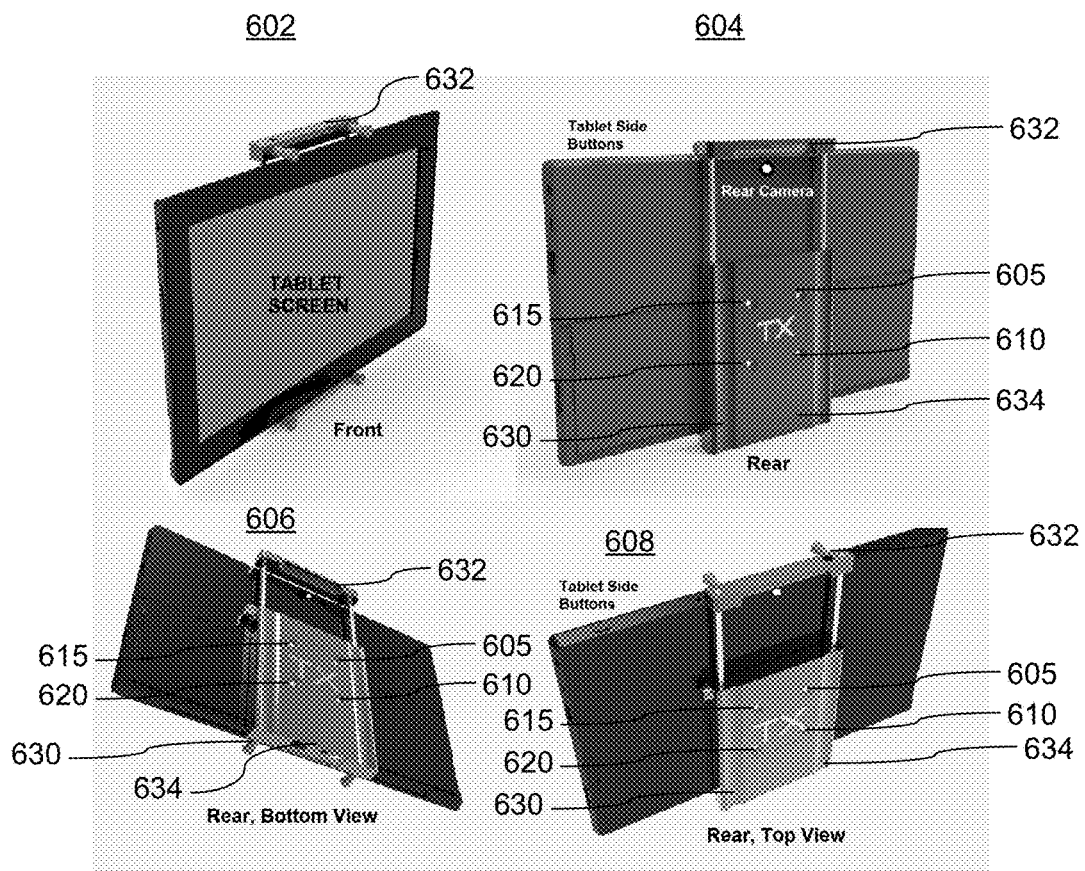
FIG. 6C illustrates four views showing an illumination device, in accordance with various aspects of the present invention.
Figure 6D:
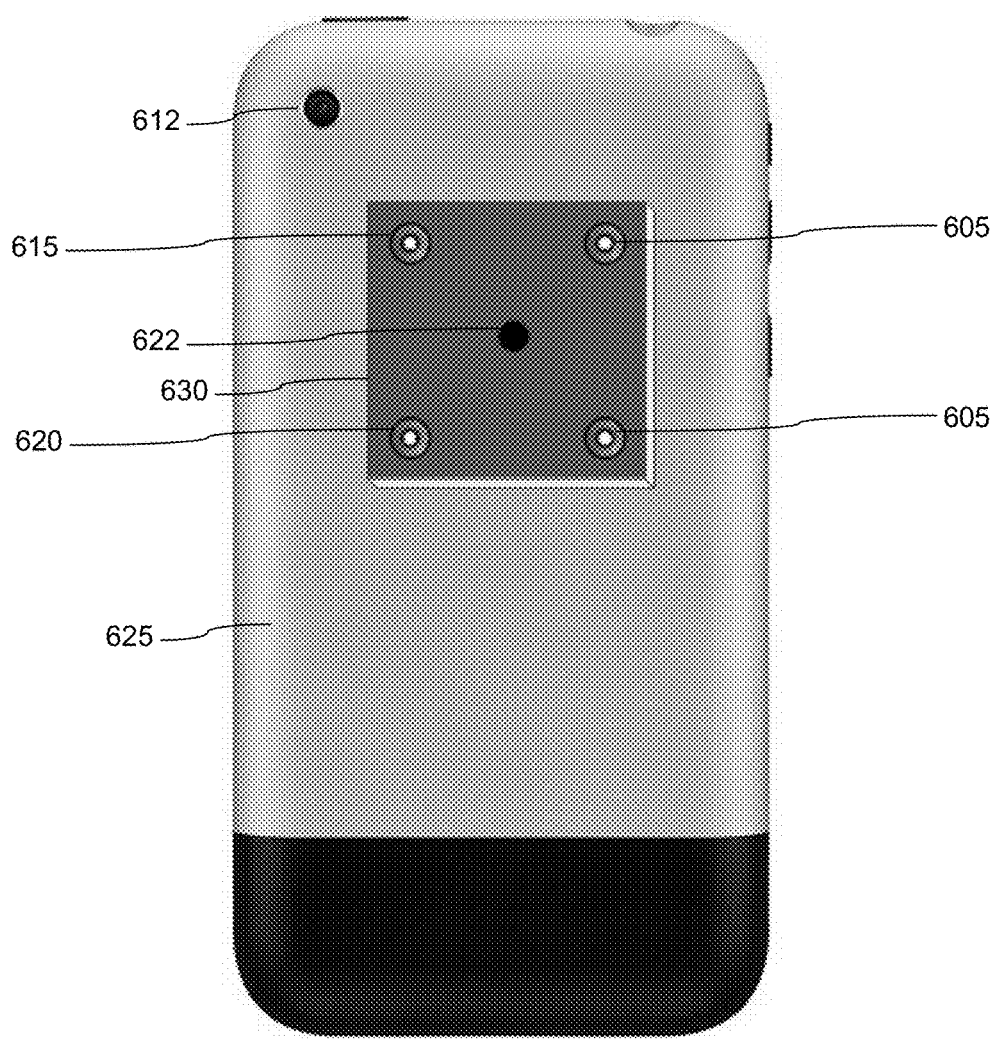
FIG. 6D illustrates an illumination device, in accordance with various aspects of the present invention.

FIGS. 6B and 6C show embodiments including four illuminators mounted to a mobile device. FIG. 6D shows an embodiment including four illuminators adhered to a mobile device.

FIG. 6B illustrates a mobile device 625 with an illumination device 630 mounted on the mobile device, in accordance with various aspects of the present invention. In this figure a larger device, for example, a tablet is shown. However, any mobile device can be used. FIG. 6B shows the camera 612 on the mobile device 625.

In the embodiment shown in FIG. 6B, the illuminator device 630 is mounted on the mobile device. In the embodiment shown, the illuminator device 630 has a sliding portion 634 and a fixed portion 632. The sliding portion 634 can be extended to adjust to fit any sized mobile device. In the embodiment shown, the illuminator device is shown mounted approximately in the middle from top to bottom of the mobile device. One of ordinary skill in the art will appreciate that the illuminator device does not have to be mounted in the center of the mobile device. However, it can be desirable to mount the illumination device such that the buttons and switches on the side of the mobile device are avoided and the camera on the mobile device is not obscured.

In one embodiment shown in FIG. 6B, a handle or pistol grip can be screwed into the illumination device. The handle can be used to hold the illumination device and the mobile device with one hand for ease of use.

FIG. 6C illustrates a mobile device with the illumination device mounted on the mobile device, in accordance with various aspects of the present invention. FIG. 6C illustrates a front view 602, a side view 604, a rear bottom view 606, and a rear top view 608. The illumination device 630 includes a sliding top portion 632 capable of adjusting the height of the illumination device 630. The illumination device also includes a bottom portion 634. Both the top portion 632 and the bottom portion 634 make contact with the mobile device to hold the illumination device to the mobile device. The embodiment shown in FIG. 6C also includes four illuminators 605, 610, 615, and 620. However, as one of ordinary skill in the art understands, any number and placement of illuminators can be used in the illumination device 630.

FIG. 6D shows a mobile device with an illumination device adhered to the mobile device, in accordance with various aspects of the present invention. FIG. 6D shows a mobile device 625 with a camera 612 including illumination device 630. Illumination device has at least one illuminator 605, 610, 615, and 620. In the embodiment shown four illuminators 605, 610, 615, and 620 are used. However, one of ordinary skill in art will appreciate that any number and any placement of illuminators can be used.

FIG. 6D also shows power button 622. Power button 622 actuates the illumination device and may be used to turn on and select the illumination level of the illumination device.

For example, if a user wants to take a picture, the user can turn on the illumination device 630 and select the illumination level to provide adequate light for the image. The illumination can be for photography or for scanning a document. In other embodiments, the user can use the illumination device for video recording. In other embodiments, the illumination device can be used as a flashlight. Illumination device 630 can be used as a promotional item and can include a logo or promotional information from a vendor, a sports team, a school, a customizable image, etc.

Figure 6E:
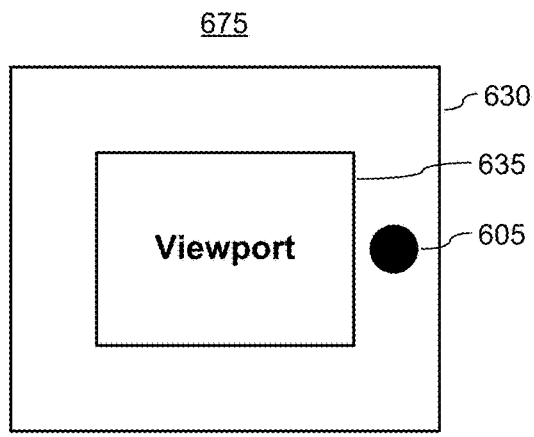
FIG. 6E illustrates some examples of illuminator location in accordance with various aspects of the present invention.
Figure 6E:
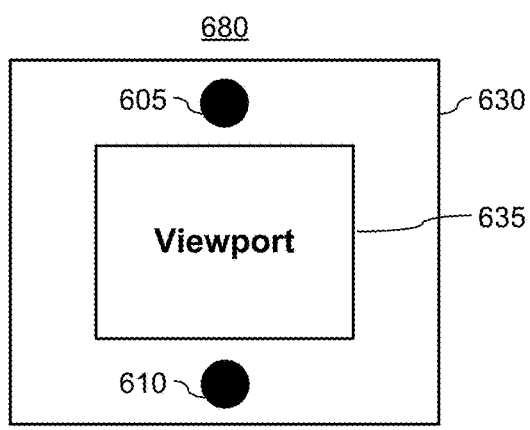
Figure 6E:
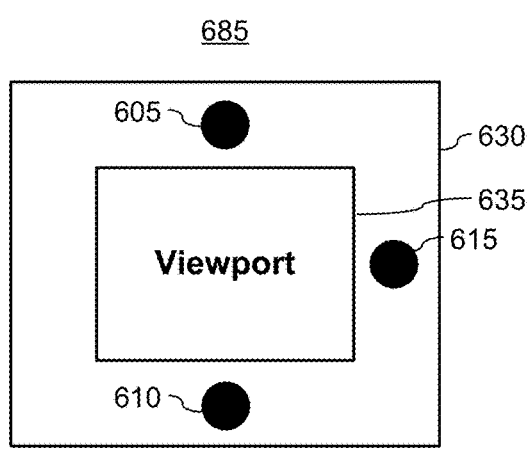
Figure 6F:
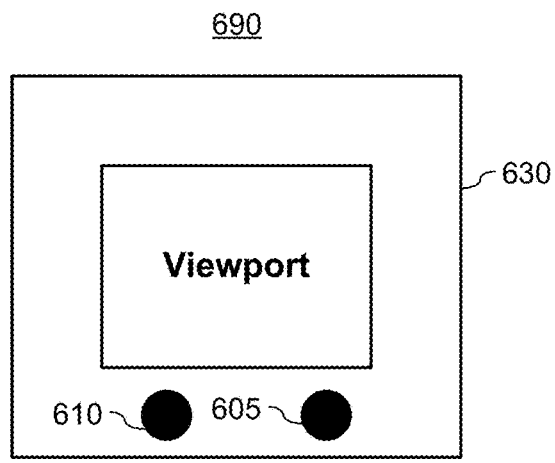
FIG. 6F illustrates some examples of illuminator location in accordance with various aspects of the present invention.
Figure 6F:
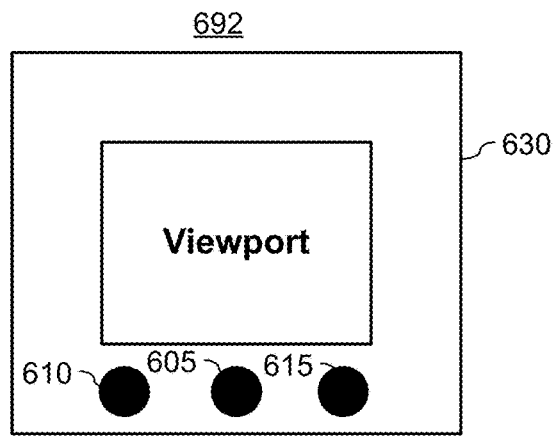
Figure 6F:
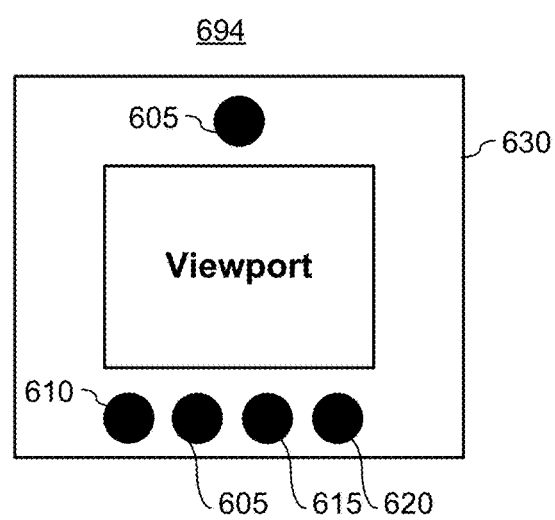

FIGS. 6E and 6F illustrate some examples of illuminator location in accordance with various aspects of the present invention. FIG. 6E shows three embodiments 675, 680, and 685. Embodiment 675 is one example of a single illuminator embodiment. Embodiments 675, 680 and 685 all show an illumination device 630 and viewport 635. Embodiment 675 shows a single illuminator 605. The embodiment shown is one example of a single illuminator. The illuminator can be in any location relative to the viewport. Embodiment 680 shows an example of a dual illuminator showing illuminators 605 and 610. Again, the two illuminators can be in any locations and configurations relative to the viewport. Embodiment 685 shows a triple illuminator including illuminators 605, 610, and 615. Again, the three illuminators can be in any locations and configurations relative to the viewport. One of ordinary skill in the art will understand that the present invention is not limited to a specific number of illuminators or to the location or configuration of the illuminators. For example, in some configurations, due to the geometries of particular mobile devices, having the illuminators adjacent to the camera may be desirable.

FIG. 6F illustrate some examples of illuminator location in accordance with various aspects of the present invention. Embodiment 690 illustrates an example of an illumination device 630 where two illuminators 605 and 610 are used, but are placed on the same side of the viewport. Embodiment 692 illustrates an example where three illuminators 605, 610, and 615 are used, but placed on the same side of the viewport. Embodiment 694 illustrates an example where four illuminators 605, 610, 615, and 618 are used and are located on the same side of the viewport. Embodiments, 690, 692 and 694 are merely illustrative not intended to be limiting. Any number of illuminators can be used. Also, any illuminator placement can be used. The illuminators can surround the viewport as shown in FIG. 6E. The illuminators can be on one side of the viewport as shown in FIG. 6F. Alternatively, the illuminators can surround the viewport asymmetrically such that one side has more illuminators than the other side.

In yet another embodiment, only some of the illuminators can be used at any given time. For example, there can be a circumstance where only some of the illuminators are turned on and some remain off or they may be partially illuminated. In one embodiment, the illuminator device can detect the level of ambient light and turn on the appropriate illuminators for the setting. In another embodiment, a user can manually turn on or off illuminators. In another embodiment, a user can adjust the power to one or more illuminators to control the level of illumination. For example, an illuminator can have multiple settings: brighter settings can be used if more light is needed and a reduced brightness setting can be used to conserve the battery or if less light is required.

Regardless of illuminator placement, LED illuminators 605, 610, 615, and 620 of embodiments of the present invention include optics that provide a flood light with a beam angle of approximately 85 degrees via shaped illumination which focuses more on the light on subjects at a wide range of distances for improved illumination for viewing, photography, scans and videos.

Regardless of illuminator placement, LED illuminators 605, 610, 615, and 620 of embodiments of the present invention may be gimbal mounted to allow user focusing to direct even more light on subjects at a wide range of distances for improved illumination for viewing, photography, document scans and videos.

Regardless of illuminator placement, LED illuminators 605, 610, 615, and 620 of embodiments of the present invention may be oriented at different angles to accommodate the specific geometry of a given range of mobile devices to appropriately focus illumination on subjects at preferred ranges of distances for improved illumination for viewing, photography, document scans and videos.

In embodiments of the present invention, LED illuminators 605, 610, 615, and 620 of embodiments of the present invention can also be combined with diffusers or polarizers which can eliminate reflections, soften the illumination and eliminate hot spots to improve or enhance the captured photo, document scan or video.

LED illuminators 605, 610, 615, and 620 of embodiments of the present invention, at for example, 500 Lumens continuous shaped as a floodlight, provide sufficient illumination in most situations for smartphones to use relatively short shutter speeds and small apertures to ensure extremely sharp images that are similar in quality to those that may be taken in good lighting conditions—without using a flash.

LED illuminators 605, 610, 615, and 620 of embodiments of the present invention, at for example 500 Lumens continuous shaped as a floodlight, provides sufficient illumination that eliminates most shadows caused by direct lighting, thereby providing superior photos of two and three dimensional items for example, documents, document scans and objects.

Embodiments of the present invention including a battery, for example, a 2600 mAH battery and 2 hour operating time at maximum (500 Lumens) output and over 24 hours operating time at 50 lumens, which is equivalent or better than most smartphone's intrinsic LED illuminators, are designed to be operated in continuous mode while the user operates his or her smartphone camera.

Embodiments of the present invention are ideal for High Dynamic Range (HDR) photography since the illumination device provides enhanced and continuous ambient light sufficient for HDR applications where the intrinsic illuminators on the smartphone would be excluded.

Embodiments of the present invention locate the LED Illuminators 605, 610, 615, and 620 in such a way that they are virtually co-planar with the mobile device camera so that the camera's sensors and automated exposure logic can be fully exploited.

Embodiments of the present invention provide 500 Lumens or more continuous shaped as a floodlight, which results in superior illumination for use as a flashlight in almost any work environment. Most "real" LED flashlights provide between 25 and 100 Lumens. The typical smartphone LED illuminator, because of battery limitations, will provide about 5 Lumens of output when operated as a flashlight, which is about the same as a giveaway keychain LED flashlight. And with its own, independent 2600 mAH battery, embodiments of the present invention can operate for up to two hours at full intensity without draining the mobile device battery the way mobile device LED illuminators do. In embodiments of the present invention, when operated in less than maximum capacity, the present invention can operate for tens of hours.

The illumination device 630 of embodiments of the present invention can include a controller that enables the user to select the brightness level of the illuminators for optimal illumination, saving battery life or both.

The illumination device 630 of embodiments of the present invention can also employ user input or Bluetooth or other methodology to sense the type of mobile device 625 and then, knowing where the camera is positioned, to manually or automatically adjust the brightness and/or direction of each LED illuminator 605, 610, 615, and 620 to compensate for horizontal or offset. Doing so would thereby improve uniformity and applicability of illumination.

The illumination device 630 of embodiments of the present invention can also ensure that the LED illuminators 605, 610, 615 and 620 are virtually co-planar with the mobile device camera, thereby providing efficient use of the camera's exposure automation.

The illumination device 630 of embodiments of the present invention can feature shaped illumination that targets more light on the subject by using specifically shaped reflective cones in each LED illuminator 605, 610, 615, and 620 that directs the light in a specific pattern designed for the application.

The illumination device 630 of embodiments of the present invention can be equipped with diffusers or polarizers that can soften the light to reduce reflections or hotspots which is important for photographing reflective surfaces.

The illumination device 630 uses the illuminators to provide shaped illumination using optics, position of the illuminators, and/or orientation of the illuminators as described herein.

Figure 6G:
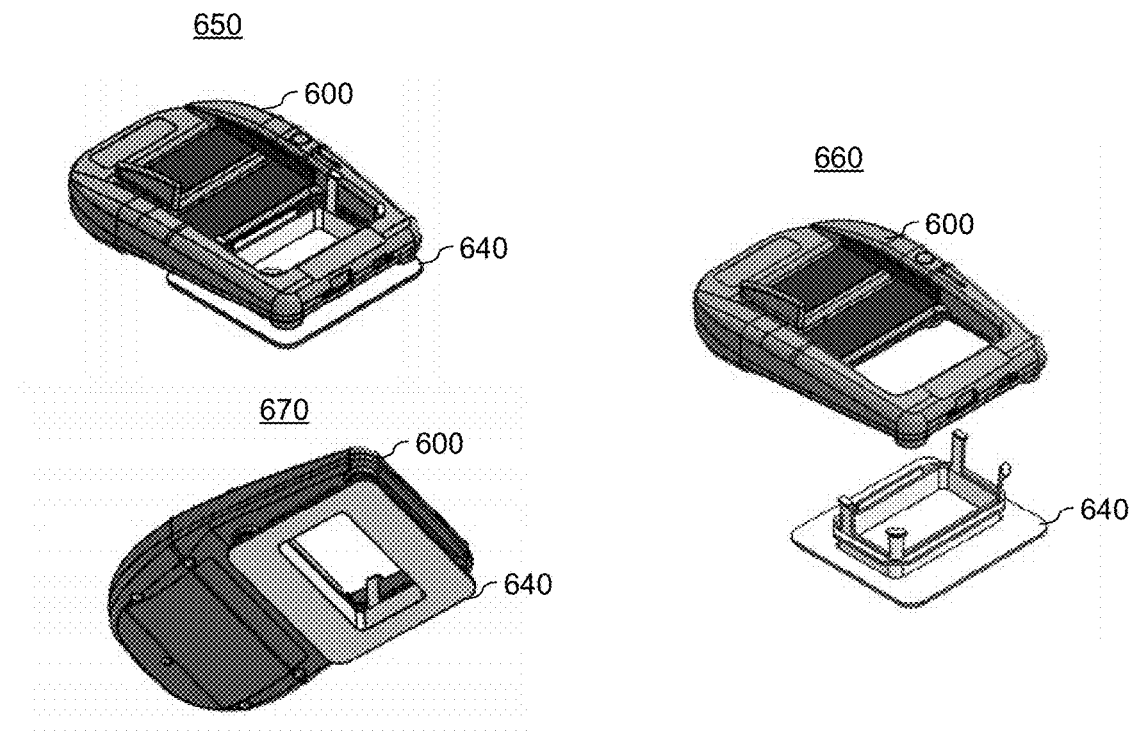
FIG. 6G illustrates an illumination device including diffusers or polarizers in accordance with various aspects of the present invention.

FIG. 6G illustrates an illumination device 600 including diffusers or polarizers in accordance with various aspects of the present invention. FIG. 6G shows three views 650, 660, and 670. View 650 shows a view of the back of an illumination device 600 with diffuser/polarizer 640. View 660 shows an illumination device 600 with diffuser/polarizer 640 not attached. View 670 shows the front of an illumination device 600 with diffuser/polarizer 640. In some embodiments that employ polarizers for reduced reflections or hotspots, an additional polarizing element may be required to be placed in front of the camera (not shown).

The illumination device 630, in embodiments of the present invention, can be equipped with LEDs in colors other than white. For example, in one embodiment, LED illuminator 605, 610, 615, and 620 can be white and other LEDs (not shown) in one or more other colors can be used to create special effects. In one embodiment, a plurality of white and colored LED illuminators can be used together to create yet a wide range of colors.

The illumination device 600, in embodiments of the present invention, can be equipped with LEDs that are infrared or ultraviolet to enable special purpose photography. For example, in one embodiment, LED illuminator 605, 610, 615, and 620 can be ultraviolet to enable detection of foreign objects in bedding, food or at crime scenes.

The illumination device 600 of embodiments of the present invention can be equipped with an internal controller or a Bluetooth, audio-interface based, wi-fi-based or wired interface to the mobile device that, when combined with color LEDs will also enable the user to change the color of the illumination for special effects.

The illumination device 600 of embodiments of the present invention can be equipped with a Bluetooth, audio-jack based, wi-fi-based wired or optical sensor that will also support flash photography in addition to hot-light (continuous) illumination mode.

The illumination device 600 of embodiments of the present invention can be equipped with one or more microphones (not shown) that can connect via Bluetooth, audio-jack or other wireless or wired interface to the mobile device to enable enhanced audio recording in conjunction with or in addition to illumination.

The illumination device of embodiments of the present invention can be equipped with one or more speakers and an amplifier that can connect via Bluetooth, audio-jack or other wireless or wired interface to the smartphone or other mobile device to enable enhanced audio playback in conjunction with or in addition to illumination.

The illumination device of embodiments of the present invention can be equipped with flash memory or other type of solid state memory that would connect via Bluetooth or other wireless or wired interface to the smartphone or other mobile device to enable local storage of photographs, media and data files that could be accessed by the smartphone or other devices.

The illumination device of embodiments of the present invention can be equipped with a desktop stand (or engineered into a desktop stand) that would enable users to photograph or scan documents using their smartphone in a highly repeatable fashion.

Such a desktop stand can also feature optional diffusers or polarizers for enhanced photography and scanning of reflective items. Such a desktop stand can also feature a sheet feeder and a Bluetooth or other interface to the mobile device to enable automatic document scanning using the smartphone to capture, store, and communicate the documents being scanned.

Figure 7:
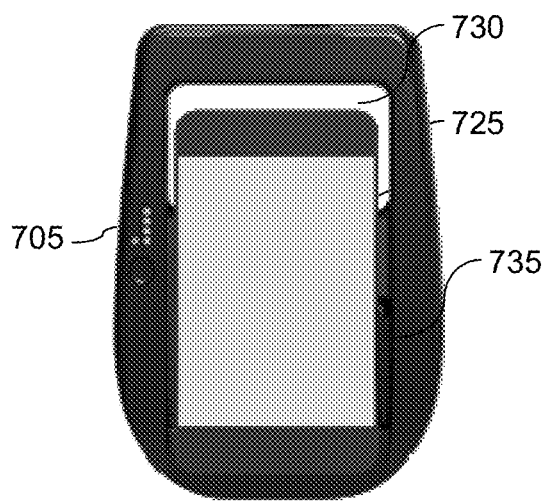
FIG. 7 illustrates an illumination device, in accordance with various aspects of the present invention.

FIG. 7 illustrates an illumination device, in accordance with various aspects of the present invention. FIG. 7 shows the top of an illumination device 700 including a power indicator 705, viewport 730, and mount 735. FIG. 7 also shows the mobile device 725 mounted within the illumination device 700. Mobile device 725 is not part of the present invention, but is shown FIG. 7 to illustrate the way mobile device 725 would be used with the present invention.

FIG. 7 shows viewport 730. Viewport 730 places the smartphone's camera in the Viewport so that it is surrounded by an "array" of LED Illuminators that provide ideal, uniform illumination that is focused on the subject. Mount 735 can be a 2-degree of freedom universal mount that enables secure mounting of any mobile device with an easy to use mechanism that places the mobile device's camera in the viewport so that it is surrounded by LED illuminators.

Figure 8:
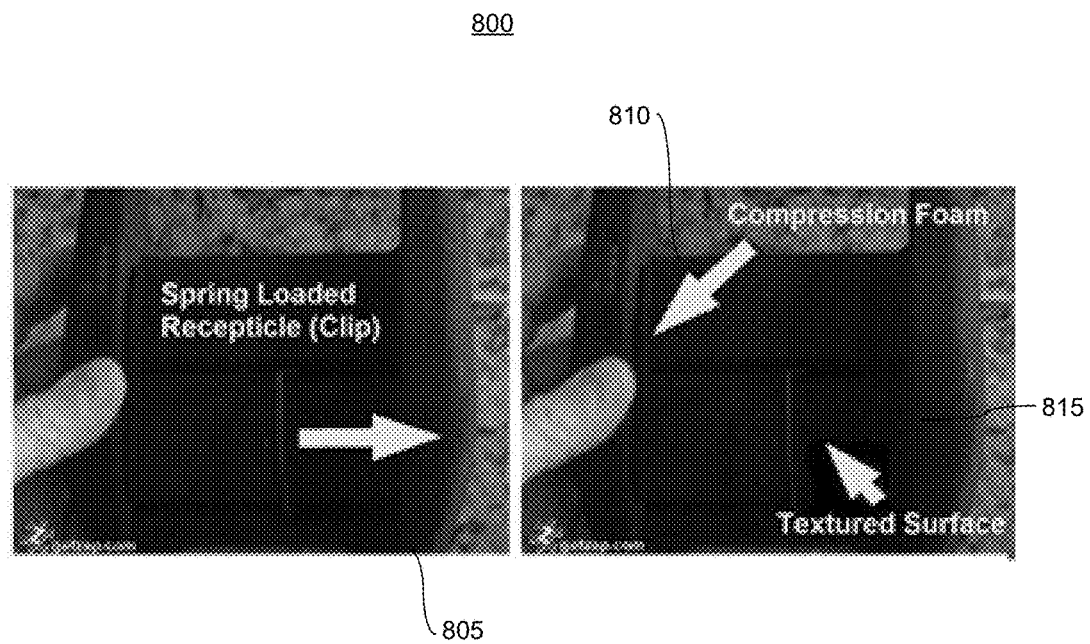
FIG. 8 illustrates a universal mount, in accordance with various aspects of the present invention.

FIG. 8 illustrates a universal mount, in accordance with various aspects of the present invention. FIG. 8 shows universal mount 800 including spring loaded mechanism 805, compression foam 810, and textured surface 815. Universal mount 800 can work with smartphones, tablets, and phablets in a variety of sizes with or without cases and is not specific to any manufacture of mobile device. Universal mount 800 of embodiments of the present invention can hold the mobile device in place, even when the assembly is held upside down or subject to vibration and even if the device is dropped, thereby protecting the smartphone or mobile device.

In one embodiment, a specific mount can be used. The specific mount can be designed to operate with a specific mobile device size range or specific set of models which could reduce the overall size of illumination device. For example, the specific mount would only work for the iPhone 5™ or only work for the MotoX™ or only work for the GoPro Hero3™ or any other specific model of phone or camera. A specific mount can be a case with built in battery and LED illuminators. Alternatively, the specific mount can be larger than the case, but be an ergonomic handheld mount, similar to the mount used with the universal mount. Alternatively, on large mobile devices or for very small illumination applications, the mount may be smaller than the mobile device and use the universal mount to adhere the mobile device to simply provide illumination without consuming the battery of the mobile device.

Figure 9:
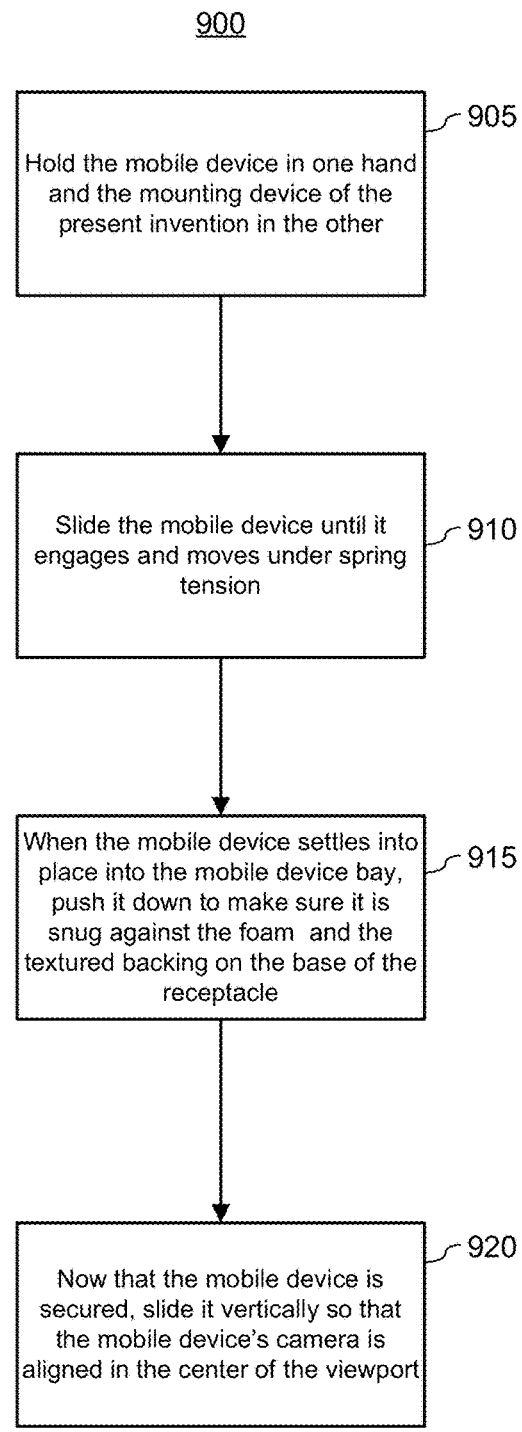
FIG. 9 illustrates a method of inserting a mobile device into the universal mount, in accordance with various aspects of the present invention.

FIG. 9 illustrates a method of inserting a mobile device into the universal mount, in accordance with various aspects of the present invention. FIG. 9 shows method 900 including holding the mobile device in one hand and the holding the mobile mounting device of the present invention in the other 905, sliding the mobile device until it engages and moves under spring tension 910, when the mobile device settles into place into the mobile device bay, pushing it down to make sure it is snug against the foam and the textured backing on the base of the receptacle 915, and now that the mobile device is secured, sliding it vertically so that the mobile device's camera is aligned in the center of the viewport 920.

Method 900 can be used with universal mount device 800. Spring loaded mechanism 805 can be used to adjust to the size of many tablets, phablets, smartphone, and other mobile devices. Compression foam 810 and textured surface 815 assist in holding the mobile device into place.

The universal mounting device 800 works in conjunction with viewport 730 to enable the mobile device to be adjusted "vertically" in a mobile device bay to center the smartphone's camera in the viewport (vertically). Doing so surrounds the smartphone camera with the array of LED illuminators 605, 610, 615, and 620 that provide uniform illumination of subjects (versus off-axis illumination) that is optimal for on-the-go photography. Alternatively, the universal mounting device may be used without a viewport to accommodate specific geometries of certain mobile devices.

The universal mount device 800 can accommodate virtually any smartphone and many other mobile devices including cameras, phablets, tablets video cameras and others. Embodiments of the present invention feature a universal mount device 800 that can securely hold a wide range of smartphones other mobile devices including iPads and other tablets, Go-Pro and other cameras, phablets, video game systems, video cameras, and others.

The universal mount device 800 can have two degrees of freedom to accommodate the widest range of mobile device sizes. A horizontal orientation to accommodate mobile devices of various widths and a vertical orientation to accommodate mobile devices of various heights that allows the mobile device camera to align with the viewport of the illumination device or to orient the illuminator appropriately with the camera of the mobile device while avoiding buttons or switches on the mobile device.

The universal mount device 800 securely holds mobile devices of any size (within a given range of sizes) with or without cases. To accommodate a wide range of mobile device and case widths, while avoiding switches located on the sides of the mobile devices, the universal mount device 800 uses a bay to hold the mobile device. The bay includes a textured base 815, a left side wall with compression foam 810 and a spring loaded retention clip 805 that is coated for traction and is curved and slanted to provide positive retention for the smartphone. This retention mechanism 805, combined with the compression foam 810 on the wall of the mobile device bay and the textured surface on the bottom of the mobile device bay, adapts to mobile devices with and without cases of various widths and retains them securely.

One feature of embodiments of the present invention is that embodiments of the present invention are ergonomic and can be used with one hand. In a field environment, it is useful to be able to take photos one handed since the other hand may be needed for balance, support or holding a tool or other object. It is often difficult with a smartphone or other mobile device to take a photo with one hand since one hand needs to be used to hold the phone still and the other hand used to push the touchscreen button to take the photo. With an external 3.5 mm attach point of similar flash or continuous light style device available for smartphones, it may be impossible to take a photo with one hand since the flash may be positioned where a hand would block the light flash, thereby requiring 2-handed operation.

Embodiments of the present invention allow single handed operation. By virtue of its size and geometry, embodiments of the present invention enable a user to hold the system with either their left or right hand and actuate the shutter release button on their mobile device with their thumb, which is usually located at the bottom center of the smartphone's touchscreen display.

In some embodiments, the illumination device may be equipped with Bluetooth, audio-jack or other wired or wireless interface to the mobile device that would enable the illumination device to actuate the shutter release on the mobile device.

Figure 10:
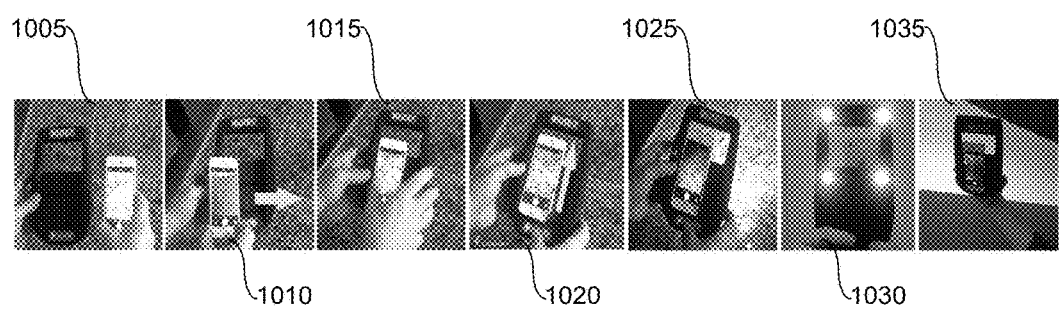
FIG. 10 illustrates a sequence of photos of insertion of a mobile device into an illumination device, in accordance with various aspects of the present invention.

FIG. 10 illustrates a sequence of photos of insertion of a mobile device into an illumination device, in accordance with various aspects of the present invention.

Image 1005 illustrates step 905 from FIG. 9 of holding the mobile device in one hand and the holding the illumination device of the present invention in the other. Image 1010 illustrates step 910 from FIG. 9 sliding the mobile device until it engages and moves under spring tension. Images 1015 and 1020 illustrate step 915 from FIG. 9, when the mobile device settles into place into the mobile device bay, pushing it down to ensure it is snug against the foam and the textured backing on the base of the receptacle. Image 1025 illustrates step 920 from FIG. 9 now that the mobile device is secured, sliding it vertically so that the mobile device's camera is aligned in the center of the viewport. Image 1030 illustrates the lighted bottom of the lighted mobile mounting device. Image 1035 illustrates the top of lighted mobile mounting device showing the mobile device screen as seen by a user of the device. One of ordinary skill in the art will understand that other methods for secure mounting can be employed. For example, an interchangeable set of fixtures for different sized devices can be used.

Figure 11:
FIG. 11 illustrates the ergonomic design that accommodates single handed operation, in accordance with various aspects of the present invention.
Figure 11:

FIG. 11 illustrates the ergonomic one handed design, in accordance with various aspects of the present invention. FIG. 11 shows two situations in which the ergonomic one handed design is useful. Photo 1105 shows a user on the ground taking a photo upward in low light using the ergonomic design and secure mounting of the mobile device of an embodiment of the present invention. Photo 1110 shows a user taking a photograph of a machine in low light with one hand using the ergonomic design of one embodiment of the present invention. Embodiments of the present invention provide an ergonomic platform that enhances the ability of the user to steady the smartphone and take great photographs, even with one hand and in difficult environments.

In some embodiments of the present invention, the mobile device of the present invention does not mount to the smartphone, but rather the mobile device mounts to it. Doing so enables embodiments of the present invention to provide a stable, ergonomic platform that can securely hold a smartphone or other mobile device to provide steady, single handed operation and superior illumination for mobile, on-the-go photography and capturing video in difficult work environments with poor lighting.

Figure 12A:
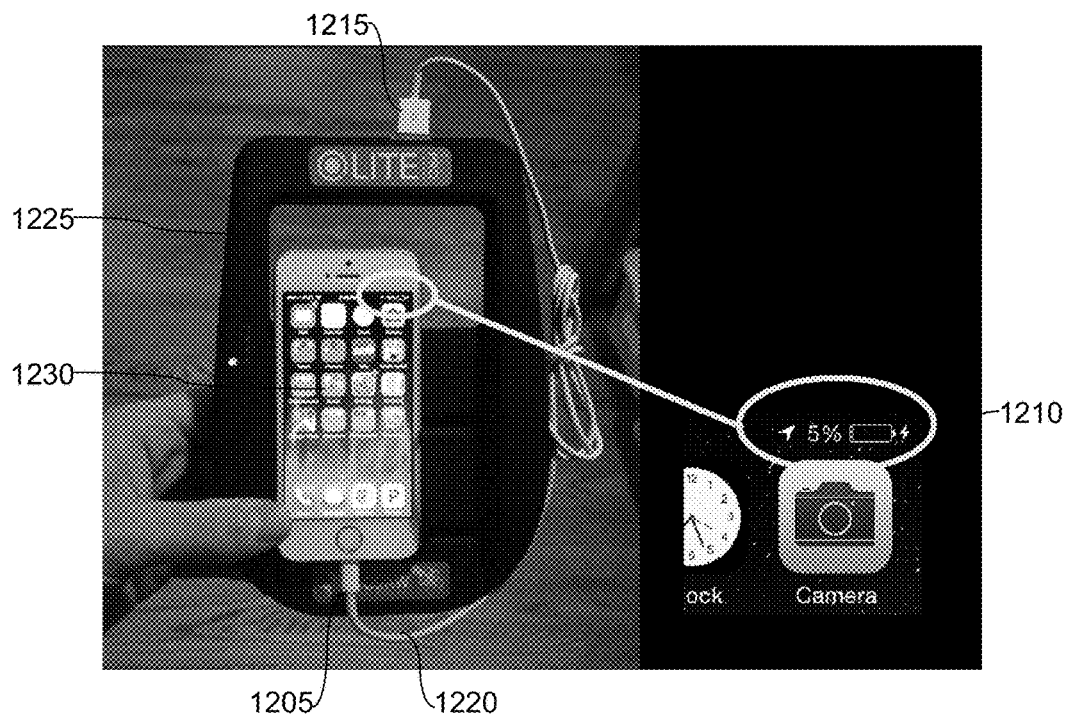
FIG. 12A illustrates a battery feature that enables the mobile device with illumination to enable charging of the smartphone while the illumination device is in operation, thereby recharging and/or saving the battery of the smartphone, in accordance with various aspects of the present invention.

FIG. 12A illustrates a battery feature, in accordance with various aspects of the present invention. While any adequate battery can be used in embodiments of the present invention, one embodiment uses a 2600 mAH Li-Ion battery, which can operate the illumination device at full power (for example 500 Lumens) continuously for approximately 2 hours, when fully charged. At lower light levels, for example 5 Lumens, which is equivalent to that provided by the intrinsic LED illuminators found within smartphones, the present invention with the 2600 mAH battery could operate for over 100 hours, when fully charged. In addition, the illumination device can also recharge a mobile device while in use, so that users can recharge their mobile device battery while using the illumination device. This enables users to conduct their work even if their mobile device is discharged, which is a frequent problem. Smaller sized batteries can be used in embodiments that require small size illuminators. Larger size batteries or multiple batteries can be used to provide enhanced battery life.

FIG. 12A shows the recharging capability in accordance with embodiments of the present invention. FIG. 12A shows 1200 including illumination device 1225 with mobile device 1230. Illumination device uses cable 1220 to connect via connector 1205 to mobile device port (for example, lightning or universal serial bus (USB) port) to illumination device 1230 port via connector 1215. FIG. 12A also shows an enlargement of mobile device 1230 screen including charge indicator 1210. Charge indicator 1210 is an indication of the charge of mobile device 1230 battery. Other embodiments of the present invention can employ a retractable charging cable or inductive charging of the mobile device so that neither an external charging cable or any charging cable whatsoever would be required to support the charging of the mobile device from the illuminator's battery.

Figure 12B:
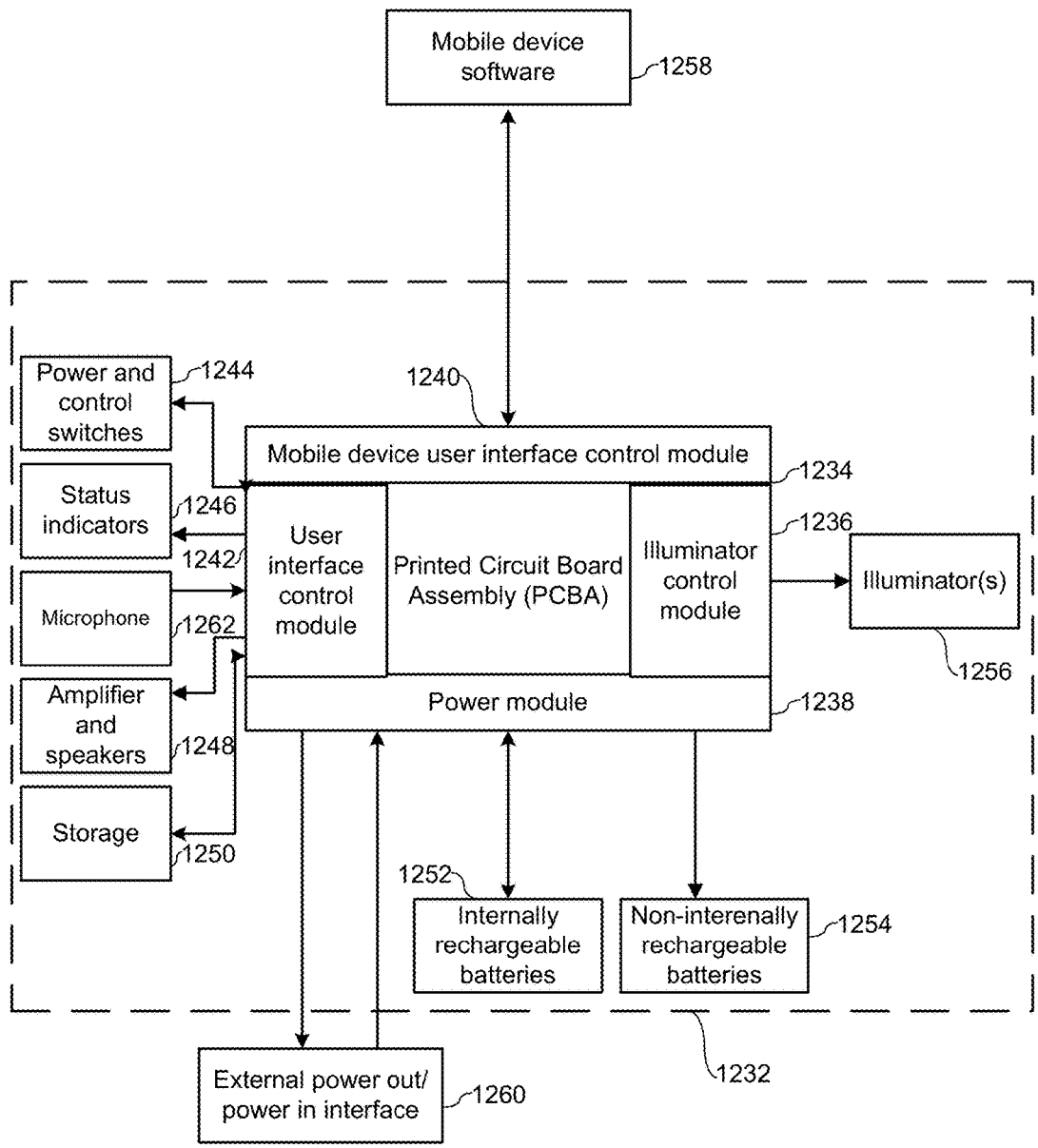
FIG. 12B shows a block diagram of the electronics of an illumination device, in accordance with various aspects of the present invention.

FIG. 12B shows a block diagram of the electronics of an illumination device, in accordance with various aspects of the present invention. FIG. 12B shows illumination device 1232 including a printed circuit board assembly 1234, illuminator(s) 1256, internally rechargeable batteries 1252, non-internally rechargeable batteries 1254, power and control switches 1244, status indicators 1246, optional microphone 1262, optional amplifier and speakers 1248, and optional storage 1250.

The printed circuit board assembly (PCBA) 1234 comprises a mobile device user interface module 1240. Mobile device user interface module 1240 can interface with the mobile device software 1258. Some embodiments will not employ mobile device software 1258. In embodiments that use mobile device software 1258, mobile device software 1258 can interface with the mobile device user interface control module 1240 using Bluetooth, Universal Serial Bus (USB), Near Field Communication (NFC), or any other interface. Various information elements can be communicated between the mobile device software 1258 and mobile device user interface control module 1240 including control, status for selection of illuminators, illumination device functions, audio in, audio out, and local storage.

The PCBA 1234 also comprises an illuminator control module 1236. Illuminator control module provides unmodulated or modulated power and actuation to illuminator(s) 1256.

The PCBA 1234 also comprises power module 1238. When equipped with internally rechargeable batteries, the power module 1238 receives and provides direct current (DC) power from and out to internally rechargeable batteries 1252. When equipped with non-internally rechargeable batteries, the power module 1238 also receives DC power in from non-internally rechargeable batteries 1254. When equipped with power-out capabilities, power module 1238 provides DC power out for recharging mobile device batteries through an external power out/power in interface 1260. This power-out charging can occur via USB, inductive interface, wireless interface, or other interface. When equipped with internal rechargeable batteries, the power module 1238 also receives alternating current (AC) or DC power in from external power out/power in interface 1260 for recharging of the illumination device internally rechargeable battery via USB, inductive interface, wireless interface, or other interface.

The PCBA 1234 also comprises user interface control module 1242. User interface control module provides control signals to and receives control signals from power and control switches 1244. User interface control module provides un-modulated or modulated power and actuation signals to status indicators 1246. One type status indicator is an LED status indicator. Other types of status indicators could include LCD displays, ePaper or other types of displays. When so equipped, the user interface control module receives audio in signals from optional microphone 1262. When so equipped, the user interface control module provides audio out signals to optional amplifier and speakers 1248. When so equipped, the user interface control module provides signals and receives signals from a storage 1250.

Figure 1:
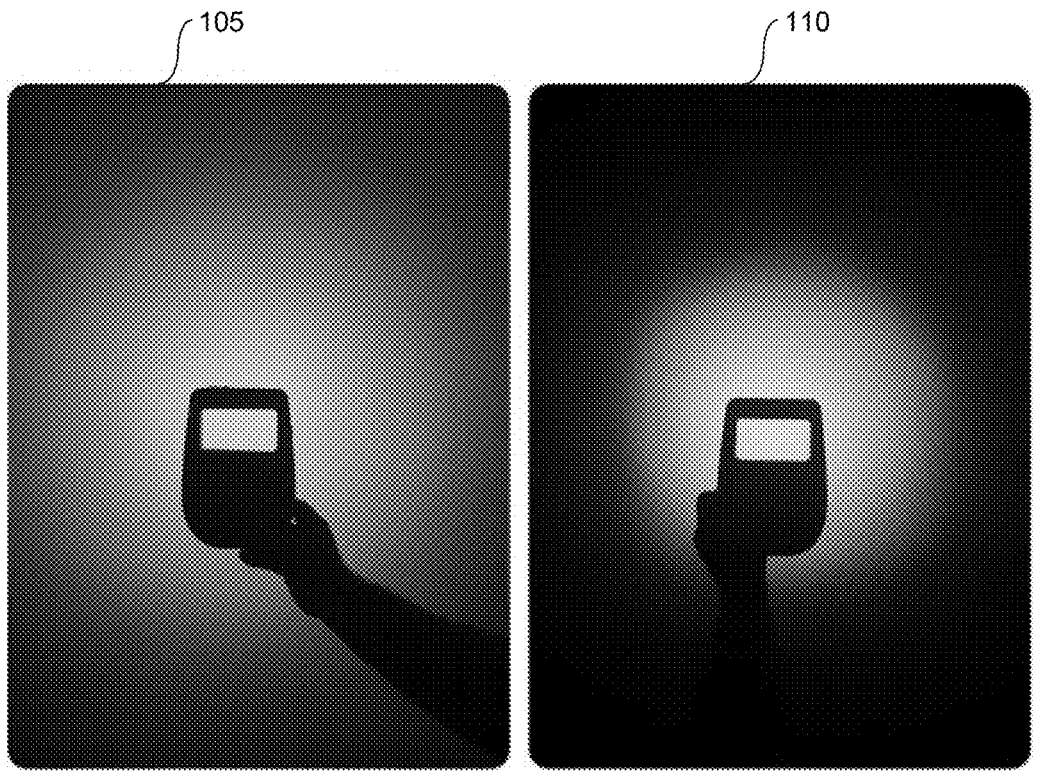
FIG. 1 illustrates two LED illuminators, one with and one without shaped illumination.
Figure 2:
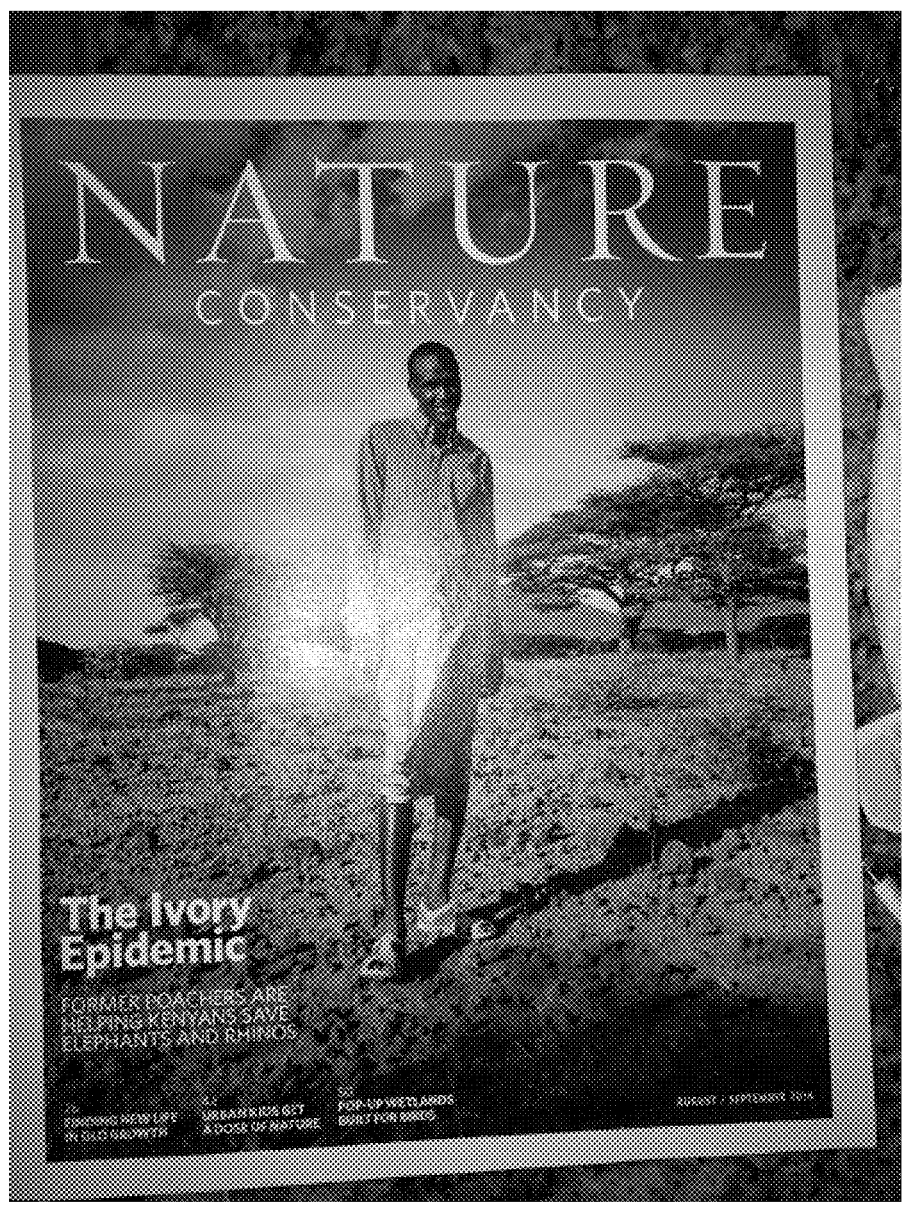
FIG. 2 illustrates a direct flash photograph of a reflective surface.
Figure 3:
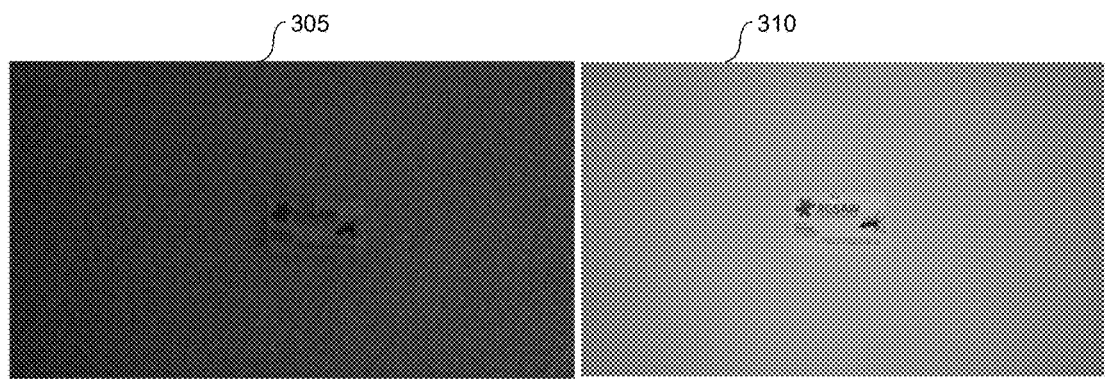
FIG. 3 illustrates an example of a smartphone photograph in insufficient illumination 305 and sufficient illumination 310.
Figure 4:
FIG. 4 illustrates how shadows can interfere with the captured image.
Figure 5:
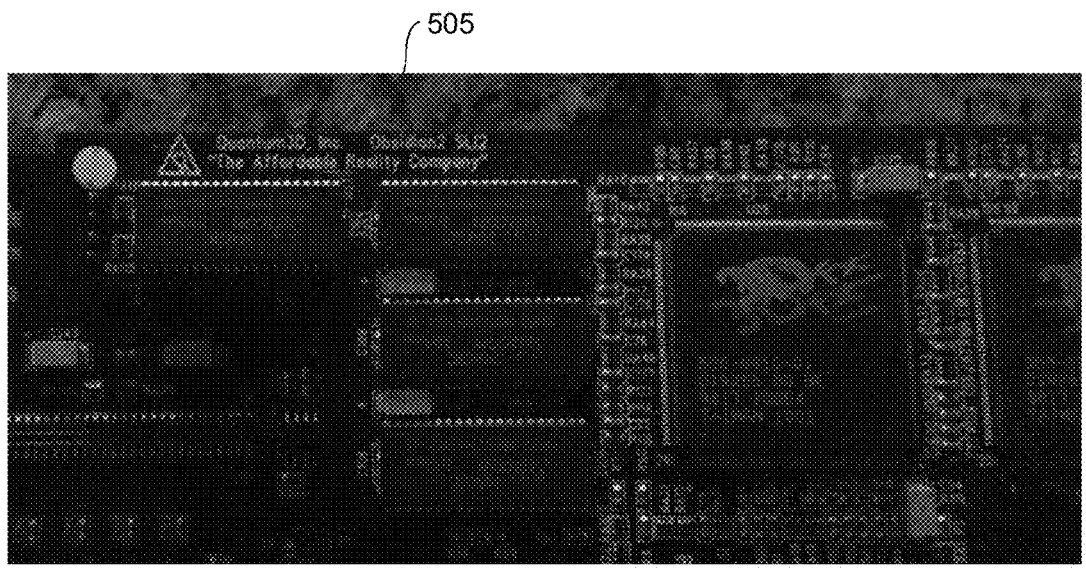
FIG. 5 illustrates the problem with not being able to use the intrinsic smartphone illuminator with the smartphone camera because certain modes of operation are mutually exclusive.
Figure 13:
FIG. 13 illustrates a photograph of a document taken using the illumination device, in accordance with various aspects of the present invention.
Figure 14:
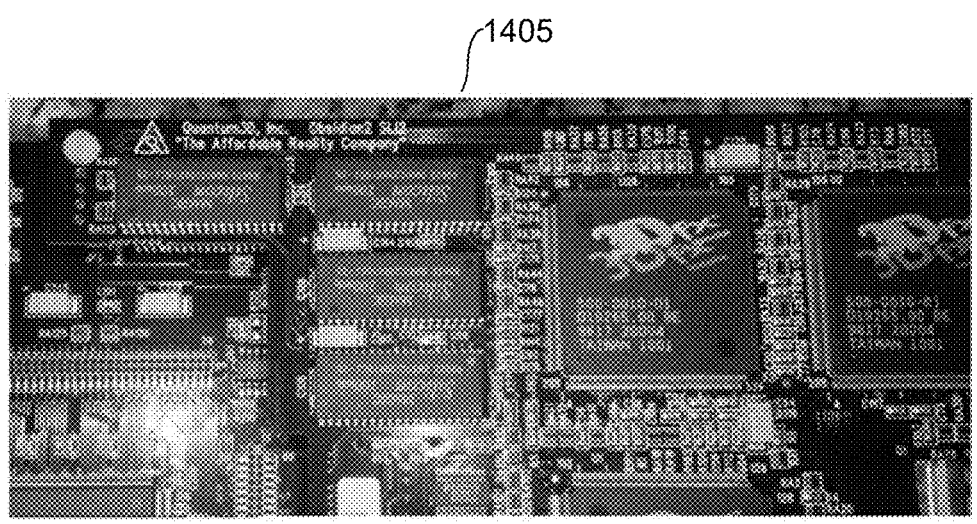
FIG. 14 illustrates a photograph taken using the illumination device, in accordance with various aspects of the present invention.

FIG. 13 illustrates a photograph taken using the illumination device, in accordance with various aspects of the present invention. FIG. 13 shows the photograph of FIG. 4 taken using the illumination device of embodiments of the present invention. As can be seen from the image 1305, the photographer and camera shadows are virtually eliminated from image 1305, which enhances the utility of the photograph or scan of the document FIG. 14 illustrates a photograph taken using the illumination device, in accordance with various aspects of the present invention. FIG. 14 shows the photograph of FIG. 5 taken using the illumination device of embodiments of the present invention. As can be seen from the image 1405, the light has been dramatically improved and the object photographed can now be seen in full light and advanced modes, such as HDR, may now be employed.

Figure 15:
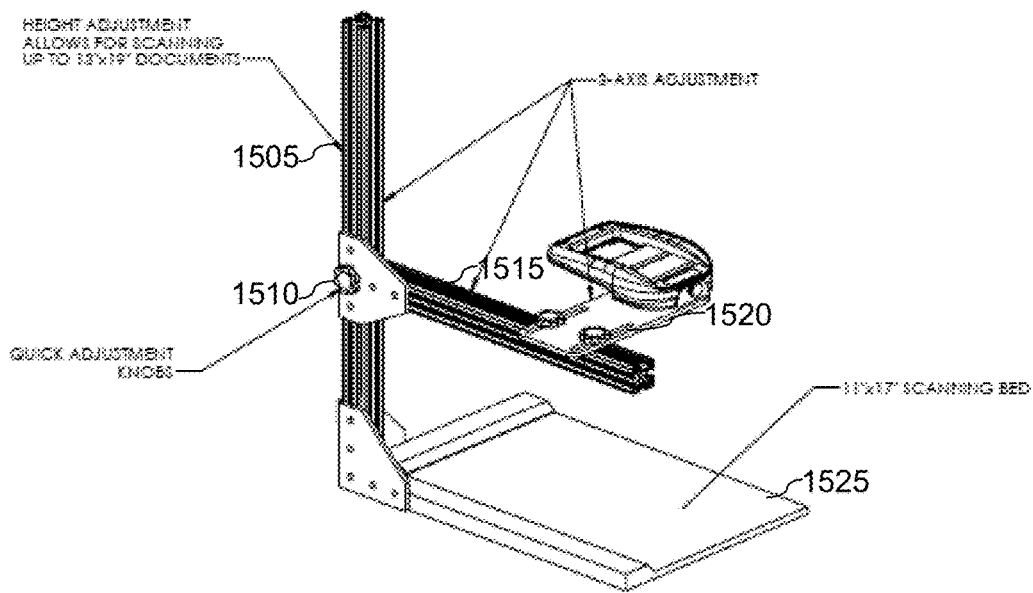
FIG. 15 illustrates a desktop stand in accordance with various aspects of the present invention.

The illumination device of embodiments of the present invention can be equipped with a desktop stand (not shown) (or engineered into a desktop stand) that would enable users to photograph or scan documents using their smartphone in a highly repeatable fashion. FIG. 15 illustrates a desktop stand in accordance with various aspects of the present invention. FIG. 15 shows desktop stand 1500 including vertical arm 1505, which allows for height adjustment so that large or small documents can be photographed. FIG. 15 also shows quick adjustment knobs 1510, which enable quick adjustment of the height. FIG. 15 also shows three axis adjustment using vertical arm 1505, horizontal arm 1515 and front/back adjustment 1520. FIG. 15 also shows scanning bed 1525 that may also include a sheet feeder that, via Bluetooth or other wired or wireless interface would advance document pages synchronously with the camera or scanning app on the mobile device. One of ordinary skill in the art will understand that other types of desktop stands for the illumination device, including fixed format stands or stands with minimal adjustment capabilities such as a vertical only adjustment for scanning standard sized items may be employed (not shown)—for example, a simple metal or molded plastic stand that is optimized for scanning letter or legal size documents.

Figure 16:
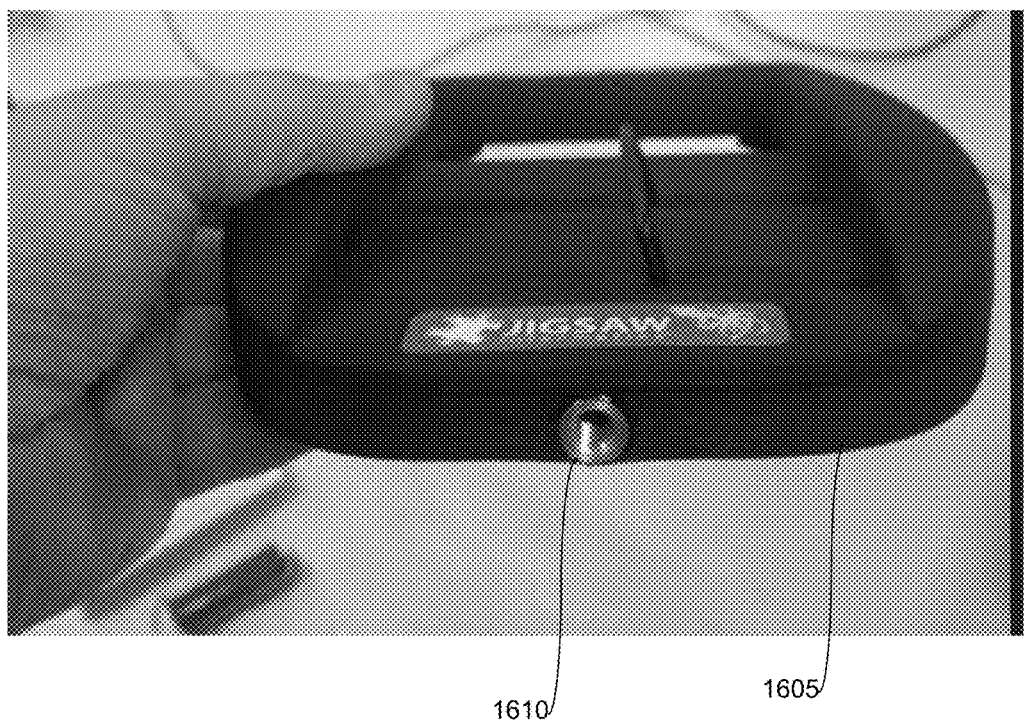
FIG. 16 illustrates an illumination device with a threaded sleeve for tripod mounting in accordance with various aspects of the present invention.
Figure 17:
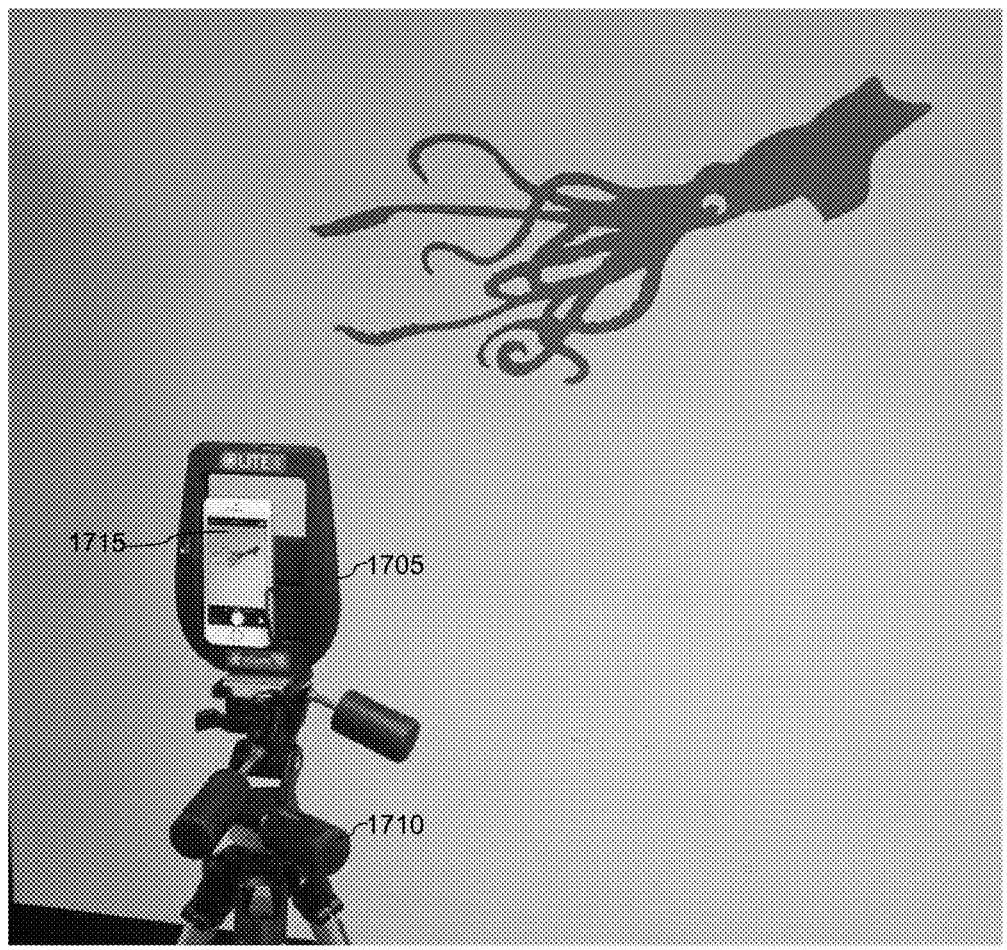
FIG. 17 illustrates an illumination device with a tripod in accordance with various aspects of the present invention.

FIG. 16 illustrates an illumination device with a threaded sleeve in accordance with various aspects of the present invention. FIG. 16 shows illumination device 1600 including illumination device 1605 and threaded sleeve 1610. The threaded sleeve permits use of a lanyard, tripod, a handle or pistol grip, other similar positioning apparatus and other attachments fitted with mating mounts, with the illumination device, which may be used to provide additional stability or hands free operation or other utility. FIG. 17 illustrates an illumination device with a tripod in accordance with various aspects of the present invention. FIG. 17 shows an illumination device 1705, mobile device 1715, and tripod 1710. FIG. 17 shows the embodiment of FIG. 16 with the threaded sleeve used with a tripod.

Figure 18:
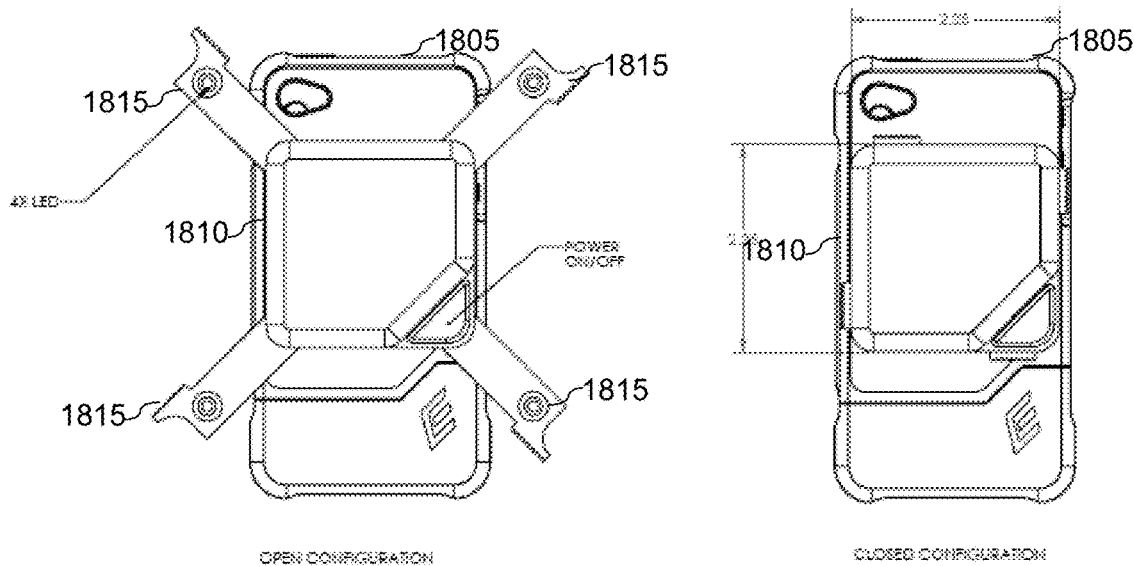
FIG. 18 illustrates a small mobile device mount in accordance with various aspects of the present invention.

FIG. 18 illustrates a small illumination device in accordance with various aspects of the present invention. FIG. 18 illustrates two views of mobile device 1805. Mobile device 1805 includes an illumination device 1810. In one view illumination device 1810 is closed. In the other view illumination device 1810 is open showing arms with illuminators 1815.

Illumination device can be specific to a single mobile device or specific size range of mobile devices rather than universal. A specific mobile device mount can resemble a mobile device case and be smaller and more compact that embodiments with a universal device mount.

Figure 19:
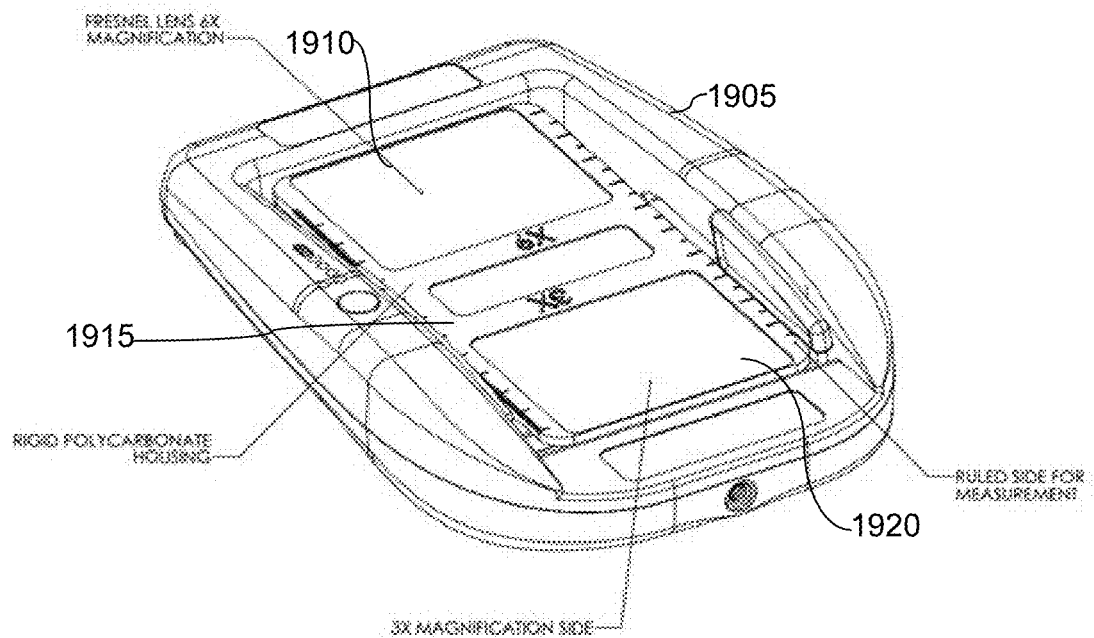
FIG. 19 illustrates an illumination device in accordance with various aspects of the present invention.

FIG. 19 illustrates an illumination device equipped with a magnifier rather than a mobile device in accordance with various aspects of the present invention. FIG. 19 shows using a magnifier instead of a mobile device to provide an illuminated, magnified view through the viewport. FIG. 19 shows an illumination device 1905 including a rigid polycarbonate housing 1915, a lens with 6× magnification 1910 and a lens with 3× magnification 1920. One of ordinary skill in the art will appreciate that other manufacturing techniques and materials for the magnifier may be used, any magnification factor can be used and one or two or more magnification factors can be used.

It will be understood by one of ordinary skill in the art that the illuminated mobile device mount system and method of embodiments of the present invention securely hold any mobile device and provide beneficial illumination for photography and video in such a way as to permit single handed use in an on-the-go environment with a long list of features that are designed to enable service personnel to easily take photos and videos in work environments.

It will be understood by one of ordinary skill in the art that the illumination device system and method of embodiments of the present invention combines a powerful LED or other illumination technology-based flashlight, magnifier, rechargeable battery and smartphone illuminator into an integrated, ergonomic handheld system that provides enhanced stability and is optimized for single handed use for mobile photography and video for service professionals and other users.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications, combinations, permutations, and variations as may fall within the spirit and scope of the appended claims.

What is claimed is:

1. An illumination system on which a mobile device containing a camera is mounted, the system comprising:
   a universal device mount capable of securely mounting a mobile device of a variety of sizes;
   an illuminator capable of providing lighting for use with the mobile device;
   a viewport configured relative to the universal device mount such that the viewport is capable of permitting the mobile device camera to view an object for the purpose of using the camera;
   electronics to operate and control the illuminator; and
   a battery capable of powering the illuminator.

2. The system of claim 1, wherein the illuminator provides enhanced illumination with reduced glare by using a polarizer.

3. The system of claim 1, wherein the illuminator uses optics to shape illumination.

4. The system of claim 1, wherein the illuminator is positioned to provide shaped illumination.

5. The system of claim 1, wherein an orientation of the illuminator provides shaped illumination.

6. The system of claim 1, wherein the battery is capable of charging a battery in the mobile device.

7. The system of claim 1 further comprising a magnifier capable of providing magnification.

8. The system of claim 1, wherein universal device mount further comprises:
   a retractable mounting system;
   a compression foam receiver; and
   a textured surface.

9. The system of claim 1, wherein the battery is a rechargeable battery.

10. The system of claim 1, wherein the battery is a non-rechargeable battery.

11. The system of claim 1, wherein the battery can charge a battery within the mobile device, during system operation and when the system is not operating.

12. The system of claim 1, wherein the battery is a plurality of batteries.

13. The system of claim 1 further comprising a stand coupled to the first portion of the illumination system providing freestanding support for the illumination system and the mobile device.

14. An illumination system configured for mounting to a mobile device, the illumination system comprising:
   a first portion configured to be mounted on a side of the mobile device;
   a second portion configured to be mounted on an opposite side of the mobile device;
   a sliding mechanism coupled to the first and the second portions configured to adjust the first portion relative to the second portion to adjust the illumination system to secure to the mobile device;
   an illuminator configured to provide illumination;
   electronics to operate and control the illuminator; and
   a battery configured to provide power to the illuminator.

15. The system of claim 14, wherein the battery is configured to charge a battery in the mobile device.

16. The system of claim 14, wherein a plurality of illuminators are configured to provide shaped illumination.

17. The system of claim 14 further comprising a polarizer configured to reduce glare, hotspots and reflections.

18. The system of claim 14 further comprising a handle coupled to the first portion of the illumination device.

19. The system of claim 14 further comprising a stand coupled to the first portion of the illumination system providing freestanding support for the illumination system and the tablet.

20. An illumination system for use with a mobile device, the illumination system comprising:
- an illuminator capable of providing shaped illumination;
- a housing configured to house the illuminator;
- an adhesive coupled to the housing configured to adhere to a mobile device;
- a battery capable of providing power to the illuminator;
- electronics to operate and control the illuminator and
- a power switch configured to provide power and control of the illuminator.

* * * * *